STANLEY J. SKINNER
INVENTOR

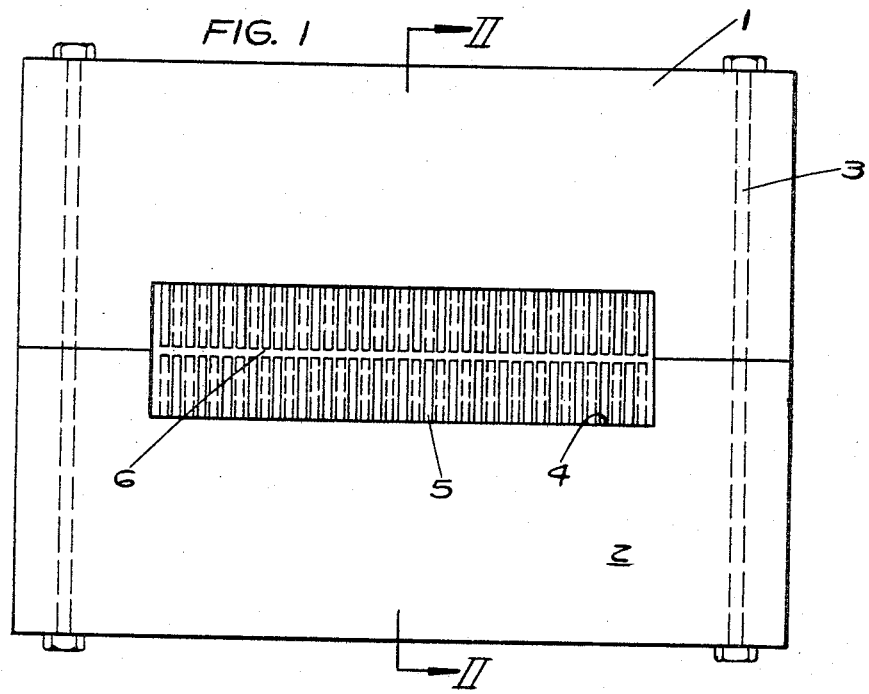
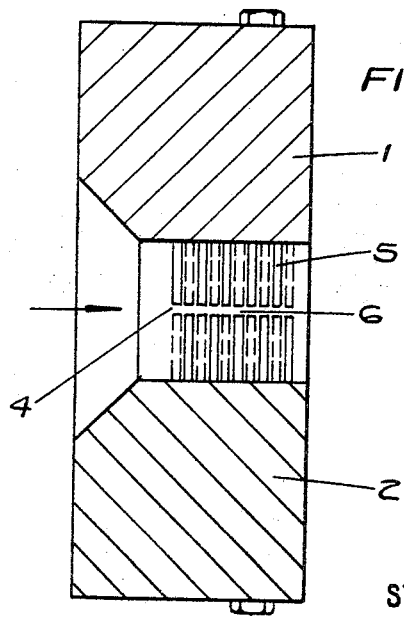

United States Patent Office 3,427,371
Patented Feb. 11, 1969

3,427,371
PROCESS AND APPARATUS FOR EXTRUDING FOAMED ARTICLES FREE FROM WARPING
Stanley John Skinner, Malpas, Newport, England, assignor to Monsanto Chemicals Limited, London, England, a British company
Filed Dec. 16, 1965, Ser. No. 514,234
Claims priority, application Great Britain, Dec. 29, 1964, 52,636/64
U.S. Cl. 264—41                9 Claims
Int. Cl. B29f 3/01

ABSTRACT OF THE DISCLOSURE

Dies and processes for extruding a foamable thermoplastic synthetic resin through a die having a plurality of obstructions distributed therein transversely to the direction of resin flow so as to provide a substantial resistance to the flow of the foamable resin, the obstructions being so positioned that any streams of resin separated by an obstruction coalesce before reaching an area of lower pressure wherein foaming occurs. The dies and processes are particularly useful for inhibiting warping and surface-wrinkling of foamed boards produced by extrusion.

---

This invention relates to foamed thermoplastic resins. More particularly, this invention relates to an improved process for the extrusion of a foamed thermoplastic synthetic resin and a new die for the extrusion of a foamed resin.

Foamed synthetic resins due to their extreme versatility have experienced great success as useful industrial products. Lightweight, excellent heat-insulating qualities, strength and workability have insured their commercial success. Generally, foams have been produced by molding techniques, however, extrusion of the resinous compositions as a foam is continually becoming more competitive with the molding operations. Extrusion of resinous foams involves the admixture of a gas or vaporous material with the resin under pressure. This mixture is forced through a suitable opening into an area of lesser pressure where the gas or vapor expands and transforms the resin to a foam. While extrusion processes have become more useful, problems still exist. For instance, it is difficult to produce a satisfactory foamed polystyrene board by extrusion. Previous attempts have resulted in producing a warped board having an irregular, wrinkled surface.

It is an object of the present invention to produce a foamed thermoplastic synthetic resin by an improved extrusion process.

Another object of the present invention is to produce a synthetic resin foam by extruding foamable resinous material through a die having obstructions therein.

Still another object of the present invention is to provide an improved extrusion process for producing synthetic resin foam wherein the foamable synthetic resinous mixture is extruded through a die having plurality of obstructions therein.

Still another object of the present invention is to provide an improved die for a foam extruding apparatus.

Another object of the present invention is to provide an improved foam extrusion die having a plurality of obstructions transversely disposed therein relative to the flow of resinous material through the die.

Generally, the present invention involves the extrusion of foamable synthetic resinous materials through a die having a plurality of obstructions therein. The obstructions within the die are positioned so as to increase the back pressure within the die; ergo an increase in the resistance to flow of resin through the die. Such an extrusion process affords a foamed resin having smooth outer surfaces and little susceptibility to warping.

The obstructions as stated above offer a substantial resistance to the flow of resin through the die which can be expressed as the increase in back pressure that results from their presence. Extrusion rates determine the magnitude of increase. For example, given an extrusion rate of from 10 to 100 pounds per square inch of flowing area per hour, it is desirable for the obstructions to give rise to an increase in back pressure of from at least 250 pounds per square inch to 5,000 pounds per square inch, and preferably from 300 to 2,000 pounds per square inch. Flowing area is defined as the cross-sectional area of the die transverse to the flow of resin at the point at which the pressure is measured.

The degree of resistance encountered by foamable resin flowing through the die may also be equated to the area of the die surface in contact with flowing resin that gives rise to friction. Preferably the obstructions are designed to provide a comparatively large die surface area when compared to the volume of the die that is occupied by the flowing resin, and the die quantity $$\left[\frac{\text{surface area of contact}}{\text{volume occupied by flowing resin}}\right]$$

can, in fact, be used to express the degree of resistance within a given die. This quantity has the dimensions of a reciprocal, and may be more conveniently expressed by considering a simple orifice die of circular cross-section of diameter D and having the same land as the die in question. Thus, quantity, $$\left[\frac{\text{surface area of contact}}{\text{volume occupied by flowing resin}}\right]$$

is equal to $$\frac{4\pi D}{\pi D^2} = \frac{4}{D}$$

Therefore, where a die quantity is the same as that for a simple circular orifice die of the same land and of diameter D, the die has an "equivalent diameter" of D. Dies having a relatively small equivalent diameter offer a greater resistance than those having a relatively large equivalent diameter. In practice, the equivalent diameter is usually less than 0.2 inch, for example, 0.01 inch to 0.15 inch, and preferably between 0.02 inch and 0.13 inch.

Preferably there are a large number of obstructions, for example several hundred, set out symmetrically. These obstructions can be, for instance, relatively small sized and closely spaced approximately equi-distant from one another. For example, the size of the obstructions can often be of a similar order to that of the spaces between them. It is also preferable for the obstructions to be approximately evenly distributed over the transverse cross-section of the die so that the resistance to flow is also evenly distributed. The distribution of the obstructions, if not even over the transverse cross-section of the die, should at least be approximately symmetrical to prevent twisting and warping of the extruded foamed product.

An obstruction that bridges the transverse cross-section of the die should be sufficiently far back in the die to allow the streams of resin passing on either side to spread out and coalesce prior to foaming. In other words, pressure within the die immediately in front of the obstruction should be high enough to prevent foaming, and where the resin is foamable by virtue of a condensable volatile substance the pressure is preferably greater than the saturated vapor pressure of the volatile substance at the extrusion temperature. Where the dimensions of a transverse bridging obstruction are large, the necessary pressure must be maintained for a greater distance in front of the obstruction than when its dimensions are small in order that the separate streams are allowed sufficient time to coalesce before foaming occurs. If necessary pressure is not maintained for a sufficient distance and the resin foams before the streams coalesce, lines of weakness are produced in the extruded product. The pressure therefore should be maintained for a greater distance. A sufficiently high pressure is insured by placing a series of non-bridging obstructions in front of the transverse bridging obstructions.

The obstructions can, for example, comprise a number of pins each of which extends either transversely or parallel to the direction of resin flow. There may be several rows of pins, preferably arranged in a staggered relationship. The pins can conveniently be of circular cross-section having a diameter from about 0.02 to about 0.1 inch. A circular cross-section is not essential, however, and the pins may assume any suitable configuration such as for instance a square, triangular, elliptical or rectangular cross-section. Where the pins are transverse to the direction of resin flow, they can, if positioned sufficiently rearward in the die, extend completely across the die, but preferably, they extend only partially across. In the latter case, there is preferably a similar row of pins extending from the opposite side of the die, and a central gap, free of obstructions, between the rows. The transverse cross-section of the die is thus not bridged, and the streams of resin flowing on either side of each pin are not separate but joined together by the other resin streams. The pins in each row can be directly opposite corresponding pins in the other row, but preferably these is a staggered relationship between the pins so that each pin is opposite a space in the other row.

The length of each pin may also be arranged substantially parallel to the direction of resin flow, and with this arrangement the pins need to be supported in some way. The support usually necessarily constitutes an obstruction bridging the transverse cross-section of the die so that, as explained above, it needs to be placed sufficiently far back within the die to ensure that the resin does not foam until the streams passing on either side of the support have coalesced.

In a preferred form of construction where the pins are substantially parallel to the direction of resin flow, the pins are hollow and are supported at their upstream ends. Each pin is open at its upstream end and closed at its downstream end, with at least one transverse opening in each pin so as to permit the flow of resin through the inside of the pin and then out through the transverse opening into a part of the die occupied by the closed ends of the pins. Preferably each pin has a plurality of transverse openings arranged equidistantly around its periphery. For example, two, three or four holes are generally suitable.

Generally, the outline of the transverse cross-section of the die excluding obstructions corresponds approximately to that desired for the extruded product. For example, the process of the invention is particularly useful for producing foamed resin in the form of a board from a die having a rectangular outline. The dimensions of the board depend on those of the die and degree of foaming that occurs when the resin leaves the die.

Extrusion dies according to the invention are exemplified in the accompanying drawings, in which:

FIGURE 1 is a front elevation of one embodiment of the die of the present invention.

FIGURE 2 is a section along the line II—II in FIGURE 1.

Figure 3:
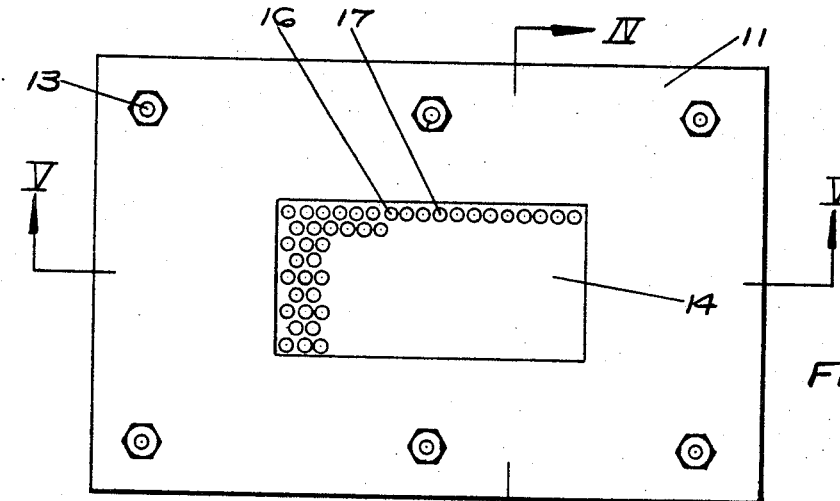
FIGURE 3 is a front elevation of a second embodiment of the die of the present invention.

The die shown in FIGURES 1 and 2 comprises two mild steel blocks 1 and 2 shaped as shown, the blocks being held together by bolts 3. Each block is recessed so that there is defined a rectangular slit 4, that is 0.25 inch wide, 2.05 inches long and has a land of 0.625 inch. Extending into the slit from each block is an array of 215 high-carbon steel pins 5, each 0.115 inch long and having a circular cross-section of diameter 0.025 inch. The pins extending from each block are arranged in eleven staggered rows, the pins in each row being 0.1 inch apart from one another, the rows being spaced 0.05 inch from one another, and the front row being 0.05 inch from the outlet end of the slit. Each pin is opposite a space in a row of pins extending from the opposite block, as shown, and there is an unobstructed gap 6, between the opposite arrays of pins.

The die has means (not shown) for attaching it to the front end of an extruder, so that when the die is in use a foamable resin such as for instance foamable polystyrene is fed past the pins in the direction of the arrow and thence through the outlet of the slit. The "equivalent diameter" of the die is 0.125 inch.

Figure 4:
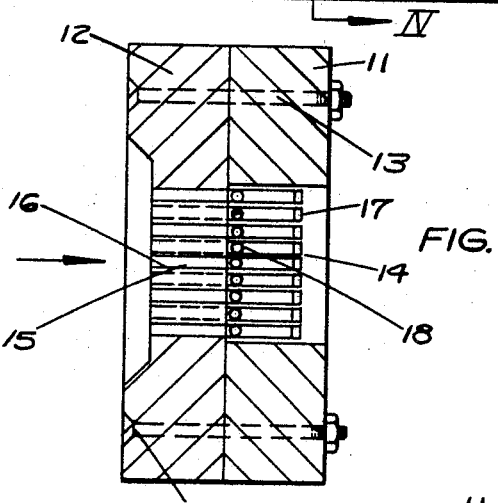
FIGURE 4 is a section along the line IV—IV in FIGURE 3.
Figure 5:
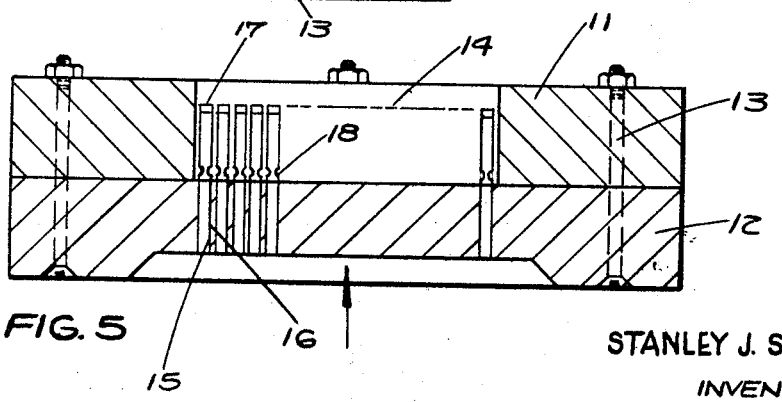
FIGURE 5 is a section along the line V—V in FIGURE 4.

The die shown in FIGURES 3, 4 and 5 represents another embodiment of the present invention and comprises two mild steel blocks 11 and 12 held together by bolts or other suitable fastening means 13. The block 12, which is 0.5 inch thick, has means (not shown) for attaching it to the front end of an extruder, so that foamable resin can flow in the direction of the arrows in FIGURE 4 and 5. The block 11 has a rectangular cavity 14 that is 1.5055 inches long by 0.5 inch wide and has a land of 0.5 inch, which is the outlet of the die. Block 12 has a series of 212 holes 15 whose diameter is 0.048 inch. These holes are arranged in a triangular pattern as shown with their centers 0.0625 inch apart. A high carbon steel capillary tube passes through each hole forming a hollow pin 16 of internal diameter 0.030 inch that projects 0.375 inch into cavity 14. The projecting end of each pin is blanked off by a plug 17. Three holes 18 of diameter 0.020 inch are drilled equidistantly around the circumference of the pin adjacent the point where it emerges from block 12. The die has an "equivalent diameter" of 0.042 inch.

During extrusion, resin flows through the pins 16 and out of the holes 18 into the cavity 14, past the outside of the pins and thence from the die into the atmosphere. The resin issuing from the holes 18 is in an unfoamed state. The resin does not foam until it has moved some way along the outside of the pins 16 due to the resistance to flow offered by the outside surfaces of the pins which increases the pressure within the die to such an extent that foaming does not take place. It will be seen that, although the block 12 constitutes an obstruction that completely bridges the frontal cross-section of the die, the resin issuing from the holes 18 has time to coalesce before foaming occurs. Further, though the portions of the pins 16 projecting into the cavity 14 also constitute obstructions, they do not divide the resin flow into separate streams. As the foaming resin passes the end of the pins, it contains a series of hollow spaces but expansion of the resin generally causes these to be filled. Additionally, small holes can be drilled in the plugs 17 so as to allow small quantities of foamable resin to be extruded into those hollow spaces and thus ensure that they are more efficiently filled. The pins can project beyond the cavity 14 if desired.

Suitable foamable resinous materials for use in the extrusion process of the present invention include but are not limited to polymers of ethylene, propylene, butadiene, styrene, vinyl toluene, methyl styrene, acrylonitrile, vinyl chloride, vinyl acetate, methyl acrylate, methyl methacrylate, ethyl acrylate or the like. Also, copolymers or interpolymers of mixtures of the above listed monomer are suitable. Preferred resins are polyethylene and polystyrene and excellent foams have been prepared from both of them. Also, acceptable foams have been prepared from modified compositions of the above listed resins, e.g. high impact polystyrene. Such modified compositions generally include the addition to the resins of acrylonitrilebutadiene-styrene type polymers (ABS) or methyl methacrylate-butadiene-styrene type polymers (MBS).

The resin used in the process is, of course, foamable, and this means that it is admixed with a blowing agent which is either a normally gaseous substance, or a volatile liquid. In many cases, the blowing agent is one that is normally gaseous but which while under pressure before extrusion is present in the liquid state. Examples of volatile substances that can be used include lower aliphatic hydrocarbons such as ethane, propane, butane or pentane, lower alkyl halides such as methyl chloride, trichloromethane or 1,2-dichlorotetrafluoroethane, and inorganic gases such as carbon dioxide or nitrogen. The lower aliphatic hydrocarbons, especially butane, are preferred. The blowing agent can also be a chemical blowing agent, which can, for example, be a bicarbonate such as for example sodium bicarbonate or ammonium bicarbonate or an organic nitrogen compound that yields nitrogen on heating, such as for example dinitrosopentamethylenediamine or barium azodicarboxylate. Cell size control additives may also be added to the foamable resinous mixture. The blowing agent may be added to the resin composition in proportions ranging from 3 to 30 percent based on the weight of the resinous material, and preferably in the range of 7 to 20 percent based on resin weight. Excellent polystyrene foam is produced for example by using a butane blowing agent over the range of 7 to 15 percent.

The process of the invention is particularly applicable to the production of foamed resins, such as polystyrene, having a density between 0.5 and 10 pounds per cubic foot and especially between 1 and 5 pounds per cubic foot.

The extrusion temperature (that is the temperature of the die and the resin within it) depends to some extent on the softening point of the resin, but in general temperatures between 95° C. and 180° C., preferably between 100° C., and 160° C. are suitable. For example, when foamable polystyrene is being extruded a temperature in the range of 130° C. to 160° C. can be used, while for polyethylene somewhat lower temperatures, for instance 100° C. to 120° C. are acceptable. Extrusion pressures range from 250 pounds per square inch to 5000 pounds per square inch, and preferably between 300 and 2000 pounds per square inch.

The extruded resin can if desired be passed through a shaping box or between rollers in order to improve its surface finish.

The process of the invention is illustrated by the following examples.

EXAMPLE I

This example describes a process according to the invention for the production of foamed polystyrene.

Foamable polystyrene containing 10% by weight of butane was extruded at a pressure of 500 pounds per square inch and temperature 150° C. through the die described above and illustrated in FIGURES 1, and 2, at a flow rate of 20 pounds per hour, the extruded polystyrene being passed between a pair of rollers set ¾ inch apart.

There was produced a board of foamed polystyrene 4 inches wide by ¾ inch thick having a density of 1½ pounds per cubic foot. It was of good longitudinal strength and flexible in a transverse direction. The effect of the pins was discernible in the form of weld lines, but these lines did not extend completely across the board and there was a strong central portion without any weld lines that imparted considerable strength to the board as a whole.

For the purposes of comparison a similar foamable polystyrene mixture was extruded through a similar die except that the pins extended completely across the die. Attempts were made to consolidate the resulting foamed elements by passing them between rollers or by passing them through a restricted shaping box. Results were completely unsatisfactory in each instance because of the lines of weakness which existed along the joints between the elements. Attempts to extrude foamed polystyrene through slit dies (without any pins or other obstructions) also resulted in an unsatisfactory product, i.e. the board was badly wrinkled and warped.

EXAMPLE II

This example describes another embodiment of the process according to the present invention for the production of foamed polystyrene.

Foamable polystyrene containing 12% by weight of butane was extruded at a pressure of 1300 pounds per square inch and temperature 120° C. through the die described above and illustrated in FIGURES 3, 4 and 5, at a flow rate of 20 pounds per hour.

There was produced a board of foamed polystyrene three inches wide by one inch thick having a density of 1½ pounds per cubic foot. It was of excellent strength in both the longitudinal and transverse directions, being well consolidated and without any major lines of weakness.

For the purposes of comparison a similar foamable polystyrene mixture was extruded through a die that was similar except that the pins 16 were omitted and the region was thus extruded through the holes 15. The product consisted of a large number of foamed elements that were loosely stuck together and which could not be consolidated either by means of rollers or by passing them through a restricted shaping box.

It is envisioned that persons skilled in the art will foresee modifications not described above. The above description should not be construed as limiting, however, but the scope of the present invention should be defined by the appended claims.

What is claimed is:

1. In a process for producing a foamed board by extruding a foamable thermoplastic synthetic resin through a die having a slit die orifice, the improvement which comprises inhibiting the formation of a warped board having an irregular, wrinkled surface by extruding the foamable resin through a die having a plurality of obstructions substantially symmetrically distributed therein transversely to the direction of resin flow so as to provide a substantial resistance to the flow of the foamable resin and increase the back pressure within the die, said obstructions being so positioned that any streams of resin separated by an obstruction coalesce before reaching an area of lower pressure wherein foaming occurs.

2. The process of claim 1 wherein the resin is polystyrene.

3. The process of claim 1 wherein the die contains an an obstruction that bridges the die cross-section, and a pressure sufficiently high to prevent foaming of the resin prior to coalescence of the resin streams separated by said obstruction is ensured by placing in front of said obstruction a further series of obstructions that do not bridge the cross-section.

4. The process of claim 1 wherein the obstructions comprise a plurality of hollow pins extending parallel to the direction of resin flow, each pin being open at its upstream end and closed at its downstream end and having at least one transverse opening situated so as to permit the resin to flow into the pin and out through the transverse opening into a part of the die occupied by the closed ends of the pins.

5. The process of claim 1 wherein the obstructions comprise a plurality of pins extending transversely to the direction of resin flow, said pins being arranged in rows such that a row of pins extends partially across the die from one side and a similar row of pins extends partially across the die from the opposite side.

6. An extrusion die suitable for the production of a foamed synthetic resin board, said die having a slit die orifice and having a plurality of obstructions substantially symmetrically distributed therein transveresly to the direction of resin flow so as to provide a substantial resistance to the flow of resin and increase the back pressure within the die, said obstructions being so positioned that, when the die is in use, any streams of resin separated by an obstruction coalesce before reaching an area of lower pressure where foaming occurs.

7. The die of claim 6 in which there is an obstruction that bridges the die cross-section, and a pressure sufficiently high to prevent foaming of a resin prior to coalescence of the resin streams separated by said obstruction is ensured by placing in front of said obstruction a further series of obstructions that do not bridge the cross-section.

8. The die of claim 6 wherein the obstructions comprise a plurality of hollow pins extending parallel to the direction of resin flow, each pin being open at its upstream end and closed at its downstream end and having at least one transverse opening situated so as to permit resin to flow into the pin and out through the transverse opening into a part of the die occupied by the closed ends of pins.

9. The die of claim 6 wherein the obstructions comprise a plurality of pins extending transversely to the direction of resin flow, said pins being arranged in rows such that a row of pins extends partially across the die from one side and a similar row of pins extends partially across the die from the opposite side.

References Cited

UNITED STATES PATENTS

| | | |
|---|---|---|
| 1,245,898 | 11/1917 | Gates. |
| 2,047,395 | 7/1936 | Stelkens. |
| 2,766,480 | 10/1956 | Henning _____ 18—12 XR |
| 2,779,972 | 2/1957 | Kins _____ 18—12 XR |
| 3,057,009 | 10/1962 | Lipski _____ 18—12 XR |
| 3,106,747 | 10/1963 | Kelley et al. _____ 18—12 |
| 3,108,148 | 10/1963 | Coyner _____ 264—50 XR |
| 3,121,130 | 2/1964 | Wiley et al. _____ 264—53 |

FOREIGN PATENTS

| | | |
|---|---|---|
| 504,933 | 12/1954 | Italy. |
| 536,758 | 12/1955 | Italy. |
| 615,177 | 2/1961 | Canada. |
| 873,140 | 4/1953 | Germany. |
| 1,355,994 | 2/1964 | France. |

JULIUS FROME, *Primary Examiner.*

P. E. ANDERSON, *Assistant Examiner.*

U.S. Cl. X.R.

264—50, 53, 54, 176; 260—2.5; 18—12, 5